United States Patent
Kim et al.

(10) Patent No.: US 6,846,767 B2
(45) Date of Patent: Jan. 25, 2005

(54) DIELECTRIC CERAMIC COMPOSITION

(75) Inventors: Woo Sup Kim, Kyungki-do (KR);
Kang Heon Hur, Kyungki-do (KR);
Jong Han Kim, Kyungki-do (KR);
Joon Hee Kim, Kyungki-do (KR)

(73) Assignee: Samsung Electr-Mechanics Co., Ltd., Suwon (KR)

( * ) Notice: Subject to any disclaimer, the term of this patent is extended or adjusted under 35 U.S.C. 154(b) by 378 days.

(21) Appl. No.: 10/123,139

(22) Filed: Apr. 17, 2002

(65) Prior Publication Data

US 2003/0100428 A1 May 29, 2003

(30) Foreign Application Priority Data

Nov. 13, 2001 (KR) ........................................ 2001-70537

(51) Int. Cl.$^7$ ............................................. C04B 35/465
(52) U.S. Cl. ........................................... 501/136
(58) Field of Search ........................................ 501/136

(56) References Cited

U.S. PATENT DOCUMENTS

| | | | | |
|---|---|---|---|---|
| 5,403,796 A | * | 4/1995 | Takahashi et al. | 501/136 |
| 5,444,028 A | * | 8/1995 | Takahashi et al. | 501/136 |
| 6,108,192 A | * | 8/2000 | Sugimoto et al. | 361/321.1 |
| 6,221,799 B1 | * | 4/2001 | Takase et al. | 501/136 |
| 6,385,035 B1 | * | 5/2002 | Matoba et al. | 361/321.1 |
| 6,387,835 B2 | * | 5/2002 | Kim et al. | 501/136 |

OTHER PUBLICATIONS

"Dielectric Properties of $Ca_{1-x}SM_{2x/3}TiO_3Li_{1/2}Ln_{1/2}TiO_3$ Ceramics", by Ki Hyun Yoon et al, Jap. J. Appl. Phys. Vol 35 (1996) pp. 5145–5149, Park 1, No. 9B, Sep. 1996.

* cited by examiner

*Primary Examiner*—Karl Group
(74) *Attorney, Agent, or Firm*—Lowe Hauptman Gilman & Berner LLP

(57) ABSTRACT

A dielectric ceramic composition of high dielectric constant and low dielectric loss, which can be co-fired with Ag electrodes, is provided for use in various parts of electric and electronic appliances. Based on a base composition with a high dielectric constant, the composition comprises glass frit and optionally CuO, as represented by the following formula:

$a$ wt. % $\{x$ CaO-$y_1$ $Sm_2O_3$-$y_2$ $Nd_2O_3$-$w$ $Li_2O$-$z$ $TiO_2\}+b$ wt. % ($ZnO$—$B_2O_3$—$SiO_2$ based or $Li_2O$—$B_2O_3$—$SiO_2$ based glass frit)+$c$ wt. % $CuO$ wherein, 13.0 mol % $\leq x \leq$ 20.0 mol %; 10.0 mol % $\leq y_1+y_2 \leq$ 17.0 mol %; 6.0 mol % $\leq w \leq$ 11.0 mol %; 60.0 mol % $\leq z \leq$ 67.0 mol % with the proviso that $x+y_1+y_2+w+z=100$; 85.0 wt. % $\leq a \leq$ 97.0 wt. %; 3.0 wt. % $\leq b \leq$ 15.0 wt. %; and $c \leq$ 7.0 wt. %.

4 Claims, No Drawings

DIELECTRIC CERAMIC COMPOSITION

BACKGROUND OF THE INVENTION

1. Field of the Invention

The present invention relates to a dielectric ceramic composition which is widely used in high frequency electronic components, more particularly, to a low-temperature cofired dielectric ceramic composition with a high dielectric constant and a low dielectric loss.

2. Description of the Prior Art

For use in a high frequency range (~2 GHz), chip type components such as LC filters, require that their electrodes be high in electrical conductivity. Ag or Cu is selected for internal electrode due to their high electrical conductivity. Ag and Cu have melting points of 961° C. and 1,083° C., respectively, which are both much lower than those of Ni (1,455° C.) or Ag—Pd.

Dielectric material must have lower sintering temperatures than the melting point of the internal electrode. In the case that Ag or Cu is employed as electrodes, available dielectric materials can be therefore selected from only a narrow range.

Generally, LTCC materials using Ag as an internal electrode are composed mainly of glass frit in combination with ceramic fillers for improving strength and dielectric properties. And its sintering temperature is about 900° C. or lower.

However, such compositions are, for the most part, found to have dielectric constants of 10 or less, which are too low to apply the compositions for LC filters. For use in LC filters, dielectric compositions are required to show a high dielectric constant, a low dielectric loss (high Q value), and a stable temperature coefficient of resonant frequency.

For instance, dielectric ceramic compositions with high dielectric constants allow the reduction of the size of the electrodes, making it possible to miniaturize devices. Additionally, such dielectrics are very useful in reducing insertion loss. Further, stable temperature coefficients of resonant frequency are helpful in stabilizing high-temperature properties of dielectrics.

Development of LTCC materials with high dielectric constants has largely been investigated in two manners: one is to develop new systems that can be sintered at 900° C. or lower; the other is directed to composite systems comprising low-temperature sintering aids or glass frit on the basis of conventional dielectric materials of high dielectric constants.

Usually, the former is Bi-based systems. These systems, however, have difficulty in being used in practice due to reactivity with electrodes, and poor reproducibility.

In association with the latter, there is known a technique in which a $CaO—Sm_2O_3—Nd_2O_3—Li_2O—TiO_2$ composition (K. H. Yoon et. al., Jpn. J. Appl. Phys., 35[9B] 5145 (1996)) with a sintering temperature of 1,300° C. or higher is combined with the sintering aid $B_2O_3—Li_2O$ to reduce the sintering temperature to 1,100° C. However, 1,100° C. is still too high to conduct the co-firing of Ag electrodes.

SUMMARY OF THE INVENTION

Therefore, it is an object of the present invention to overcome the above problems encountered in prior arts and provide a dielectric ceramic composition which exhibits high dielectric constant and low dielectric loss and can be cofired with Ag electrode.

It is another object of the present invention to provide a dielectric ceramic composition which is improved in sintering properties as well as being controllable in high frequency dielectric properties.

In accordance with an aspect of the present invention, there is provided a dielectric ceramic composition represented by the following chemical formula 1:

Chemical Formula 1

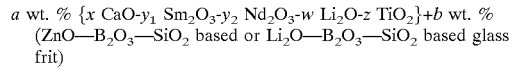

wherein, 13.0 mol % ≦ x ≦ 20.0 mol %; 10.0 mol % ≦ $y_1$+$y_2$ ≦ 17.0 mol %; 6.0 mol % ≦ w ≦ 11.0 mol %; 60.0 mol % ≦ z ≦ 67.0 mol % with the proviso that x+$y_1$+$y_2$+w+z=100; 85.0 wt. % ≦ a ≦ 97.0 wt. %; 3.0 wt. % ≦ b ≦ 15.0 wt. %.

In accordance with another aspect of the present invention, there is provided a dielectric ceramic composition represented by the following chemical formula 2:

Chemical Formula 2

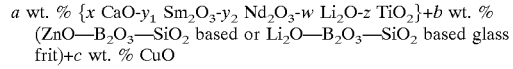

wherein, 13.0 mol % ≦ x ≦ 20.0 mol %; 10.0 mol % ≦ $y_1$+$y_2$ ≦ 17.0 mol %; 6.0 mol % ≦ w ≦ 11.0 mol %; 60.0 mol % ≦ z ≦ 67.0 mol % with the proviso that x+$y_1$+$y_2$+w+z=100; 85.0 wt. % ≦ a ≦ 97.0 wt. %; 3.0 wt. % ≦ b ≦ 15.0 wt. %; and c ≦ 7.0 wt. %.

DETAILED DESCRIPTION OF THE INVENTION

Based on $CaO—Sm_2O_3—Nd_2O_3—Li_2O—TiO_2$ with low dielectric loss and high dielectric constant, the dielectric ceramic composition of the present invention comprises $ZnO—B_2O_3—SiO_2$ or $Li_2O—B_2O_3—SiO_2$ glass frit as a sintering aid, thereby being able to be cofired with Ag electrode patterns in addition to exhibiting a high dielectric constant and low dielectric loss.

To the composition, CuO may be further incorporated. In the dielectric composition, CuO acts as a sintering aid to improve the densification of the composition, and plays a role in controlling dielectric properties at high frequencies.

As described above, the ceramic composition of $CaO—Sm_2O_3—Nd_2O_3—Li_2O—TiO_2$, although superior in terms of dielectric loss and dielectric constant, cannot be cofired with Ag electrodes because it can be sintered at 1,300° C. which is much higher than the melting point of Ag (961° C.).

In accordance with the present invention, the base ceramic composition $CaO—Sm_2O_3—Nd_2O_3—Li_2O—TiO_2$ is modified in the molar ratio of its constituting ingredients, and is incorporated with a certain amount of glass frit so as to make it possible to co-fire the ceramic composition with the Ag electrode. For use in the present invention, the base ceramic composition $CaO—Sm_2O_3—Nd_2O_3—Li_2O—TiO_2$ comprises CaO (x) in an amount of 13~20 mol %, $Sm_2O_3$ and $Nd_2O_3$ ($y_1$+$y_2$) in an amount 10~17 mol %, $Li_2O$ (w) in an amount of 6~11 mol %, and $TiO_2$ (z) in an amount of 60~67 mol %, with the proviso that x+y1+y2+w+z=100.

When CaO is used at less than 13 mol %, the composition has a large negative TCF value. On the other hand, the TCF of the composition is excessively increased in the positive direction at more than 20 mol % of CaO. Therefore, the compositions containing less than 13 mol % or more than 20 mol % of CaO cannot be used in practice. For practical uses in TCF value, that is, in the range of ±20 ppm/° C., CaO is preferably used in an amount of 13 ~20 mol %.

With the sum of $Sm_2O_3$ and $Nd_2O_3$ ($y_1+y_2$) amounting to 10 mol %, the base ceramic composition shows too large a positive TCF. On the other hand, more than 17 mol % of the sum of $Sm_2O_3$ and $Nd_2O_3$ causes an increase in dielectric loss and thus deteriorates the Q value. For these reasons, the sum of $Sm_2O_3$ and $Nd_2O_3$ is preferably defined in the range of 10~17 mol %. For example, in the presence of too small amounts of $Sm_2O_3$ and $Nd_2O_3$, a $CaTiO_3$ phase that is as high as +300 ppm/° C. in TCF is formed, giving rise to an excessive increase in the TCF of the composition. On the other hand, more than 17 mol % of $Sm_2O_3$ and $Nd_2O_3$ in sum, an $Sm_2Ti_2O_7$ phase is formed as a secondary phase which leads to drastically decreasing the Q value.

Below 6 mol % of $Li_2O$, there is formed $Sm_2Ti_2O_7$ which negatively affects the $Q_f$ value. On the other hand, when the content of $Li_2O$ is over 11 mol %, the base ceramic composition is excessively increased in TCF. Accordingly, the preferable amount of $Li_2O$ falls within the range of 6–11 mol %.

In the present invention, a glass frit composition is used to lower the sintering temperature of the base dielectric composition to such an extent as to fire the composition together with electrodes made of low-melting point metal such as Ag.

Useful in the present invention is the glass frit based on $ZnO$—$B_2O_3$—$SiO_2$—$PbO$ or $Li_2O$—$BaO$—$B_2O_3$—$SiO_2$.

Preferably, the $ZnO$—$B_2O_3$—$SiO_2$—$PbO$ based glass frit comprises ZnO in an amount of 30~70 wt %, $B_2O_3$ in an amount of 5~30 wt %, $SiO_2$ in an amount of 5~40 wt %, and PbO in an amount of 2~40 wt %.

$B_2O_3$ lowers the viscosity of the glass and accelerates the densification of the dielectric ceramic composition of the present invention. Where $B_2O_3$ is used in an amount lower than 5 wt. %, the dielectric ceramic composition is likely to not be sintered at lower than 900° C. With more than 30 wt % of $B_2O_3$, the dielectric ceramic composition has poor moisture resistance. Thus, its amount is preferably on the order of 5~30 wt. % of the glass frit.

More than 40 wt % of $SiO_2$ results in an excessive increase in the softening temperature of the glass frit which therefore cannot act as a sintering aid. When $SiO_2$ is present in an amount less than 5 wt %, its effect is not obtained. That is, a preferable amount of $SiO_2$ falls within the range of 5–40 wt. %.

With less than 2 wt % of PbO, the glass frit has too high a softening temperature (Ts), making no contribution to the sintering of the dielectric ceramic composition. On the other hand, more than 40 wt. % of PbO lowers the Ts of the glass frit to improve the densification of the composition, but has the problem of decreasing Q value. Considering these facts, the amount of PbO in the glass frit is defined in the range of 2–40 wt %.

It is preferred that ZnO is used in an amount of 30~70 wt %. Excessive amounts of ZnO lead to an increase in the softening temperature of the glass frit, making the low temperature firing impossible.

In the case of the $Li_2O$—$BaO$—$B_2O_3$—$SiO_2$ based glass frit, it preferably comprises $Li_2O$ in an amount of 1—10 wt %, BaO in an amount of 10~40 wt %, $B_2O_3$ in an amount of 20~50 wt %, and $SiO_2$ in an amount of 15~40 wt %.

For the same reasons as in the $ZnO$—$B_2O_3$—$SiO_2$—$PbO$ based glass frit, contents of $B_2O_3$ and $SiO_2$ are limited in the $Li_2O$—$BaO$—$B_2O_3$—$SiO_2$ based glass frit, but somewhat differ from those in the $ZnO$—$B_2O_3$—$SiO_2$—$PbO$ based glass frit.

Functioning to lower the softening temperature (Ts) of the glass frit to improve the densification of the dielectric ceramic composition, $Li_2O$ is used in an amount of up to 10 wt. %: otherwise, the composition is poor in moisture resistance.

When being subjected to low temperature sintering in the presence of the glass frit containing more than 40 wt % of BaO, the dielectric ceramic composition is drastically decreased in Q value. At less than 10 wt % of BaO, the softening temperature of the glass frit is increased, deteriorating the sinterability of the composition. Thus, the amount of BaO is preferably defined within the range of 10~40 wt % of the glass frit.

As for the amount of the glass frit, it is preferably on the order of 3~15 wt % based on the total weight of the composition. For example, when too little glass frit is used, sintering is not performed on the composition, which therefore becomes small in dielectric constant. On the other hand, when too much glass frit is used, a decrease is brought about in both dielectric constant and Q value.

In accordance with another embodiment of the present invention, CuO is used in the dielectric ceramic composition of the present invention to improve the densification and to control the dielectric properties. In cooperation with the glass frit, CuO acts as a sintering aid to increase the dielectric constant. Also, CuO plays a role in controlling the temperature coefficient of frequency without a large change in Q value. It is preferably used in an amount of 7 wt % or less. More than 7 wt % of CuO causes a decrease in dielectric constant and Q value, rather than improving the densification of the composition. More than solubility limit in the dielectric, CuO forms a secondary phase at the interface.

Below, a description will be given of the preparation of the dielectric ceramic composition of the present invention.

The starting materials $CaCO_3$, $Sm_2O_3$, $Nd_2O_3$, $Li_2CO_3$ and $TiO_2$, each with a purity of 99.0% or higher, are weighed according to a desired composition of x $CaO$-$y_1Sm_2O_3$-$y_2Nd_2O_3$-w $Li_2O$-z $TiO_2$, and admixed in a wet manner.

In this regard, the wet mixing is carried out by milling the starting materials in deionized water for about 16 hours with the aid of 3φ zirconia balls in a rod mill.

The slurry thus obtained is dried and calcined. Preferably, the calcination is carried out at 1,000–1,150° C. for about 2 hours at the heating rate of 5° C./min. When the calcination temperature is lower than 1,000° C., much $Sm_2TiO_7$ remains as an intermediate phase, giving rise to a decrease in Q value after sintering. At higher than 1,150° C., on the other hand, the powders become too coarse to pulverize later.

After being weighed according to a desired composition, the glass frit components are melted at 1,200–1,400° C., quenched in water, and dry-pulverized. Then, the coarse particles are finely pulverized into powder with a particle size of 0.5~1.0 μm in ethyl alcohol.

The base dielectric ceramic composition is admixed with the glass frit powder composition, together with appropriate amounts of CuO in a batch, after which the admixture is pulverized.

Following drying, the powder thus obtained was subjected to secondary calcinations at 600–700° C. The secondary calcination temperature, which is somewhat higher than the softening temperature (Ts) of the glass frit, makes the dielectric homogenous with the glass frit, thereby improving the uniformity of the dielectric ceramic composition after the sintering.

Next, the calcined powder is further broken down into a desired particle size, mixed with a binder, and molded to a desired form such as a disc or a sheet.

Afterwards, the electrode in a form of disc or sheet is calcined and co-fired at less than 900° C. to produce a desired device.

Having generally described this invention, an improved understanding can be obtained by reference to certain specific examples which are provided herein for purposes of illustration only and are not intended to be limiting unless otherwise specified.

EXAMPLE 1

$CaCO_3$, $Sm_2O_3$, $Nd_2O_3$, $Li_2CO_3$, and $TiO_2$ were weighed according to the composition of x $CaO$-$y_1$ $Sm_2O_3$-$y_2$ $Nd_2O_3$-w $Li_2O$-z $TiO_2ZrO_2$, as given in Table 1, below, and admixed in deionized water for 16 hours in the presence of 3φ zirconia balls using a rod mill.

The slurry thus obtained was dried, roughly pulverized in a mortar, and heated at the rate of 5° C./min to a temperature of 1,000–1,150° C. at which calcination was carried out for 2 hours.

Subsequently, the calcined powder was pulverized first in a mortar and then by use of a planetary mill at 200 rpm for 30 min. After being combined with a binder, the pulverized powder was molded into a disc by uniaxial compression at a pressure of 2.0 ton/cm² using a 14 mmφ mold. The specimen was sintered at 1,300° C. for 3 hours and measured for dielectric constant (K), Q value, and TCF. The results are given in Table 1, below.

In Table 1, the dielectric constant (K) and Q value were measured by the Hakki & Coleman method while the temperature coefficient of resonant frequency (TCF) was measured by the cavity method. TCF was determined between 20 and 85° C. In this regard, the specimen was measured for resonant frequency after being maintained at 20° C. for 30 min, and then heated to and maintained at 85° C. for 30 min prior to re-measurement for resonant frequency. With the measurements, the TCF was determined.

As shown in Table 1, the base ceramic composition according to the present invention (Nos. 7–9) have dielectric constants higher than 70 in addition to exhibiting a Q value of 500 or higher and a TCF of ±20 ppm/° C.

EXAMPLE 2

After composition Nos. 7 and 8 of Table 1 were roughly pulverized in respective mortars, 2.0~17.0 wt % of the glass frit was added, along with 0~8.0 wt % of CuO, to 30 g of each composition as shown in Table 4, below, in a batch. Thereafter, the admixture was pulverized again and mixed homogeneously.

The glass frit was prepared by weighing its components according to the compositions of Tables 2 and 3, melting them at 1,200~1,400° C., quenching the molten glob in water, dry-pulverizing it to coarse particles, and milling them to a size of 0.5~1.0 μm in ethyl alcohol.

Next, the admixture was dried, and calcined at 600–700° C. for 2 hours.

Subsequently, the calcined powder was pulverized first in a mortar and then milled for 30 min by use of a planetary mill at 200 rpm.

After being combined with a binder, the pulverized powder was molded into a disc by uniaxial compression at a pressure of 2.0 ton/cm² using a 14 mmφ mold. The specimen was sintered at 900° C. for 3 hours and measured the dielectric constant (K), Q value, TCF and sintered density. The results are summarized in Table 4, below.

In Table 4, comparison 2 and 13 were prepared by sintering comparison 1 and 5 at 1,050° C., respectively. Also, the samples were analyzed for sintered state and the results are summarized in Table 5.

Dielectric properties, including dielectric constant (K), Q value, and TCF, were measured in the same manner as in Example 1.

TABLE 1

| Composition No. | CaO | $Sm_2O_3$ | $Nd_2O_3$ | $Li_2O$ | $TiO_2$ | K | Q | TCF |
|---|---|---|---|---|---|---|---|---|
| 1 | 11.0 | 15.0 | 0.0 | 8.0 | 66 | 81.0 | 3000 | −60.0 |
| 2 | 21.0 | 5.0 | 5.0 | 8.0 | 61.0 | 120 | 4500 | 50.0 |
| 3 | 19.6 | 9.8 | 0.0 | 8.8 | 61.8 | 123 | 4350 | 65.0 |
| 4 | 6.7 | 17.5 | 0.0 | 8.4 | 67.4 | 75 | 500 | −85.0 |
| 5 | 19.0 | 11.0 | 0.0 | 5.9 | 64.1 | 110.5 | 450 | 32.0 |
| 6 | 11.5 | 9.5 | 4.5 | 11.5 | 63.0 | 130 | 1300 | 75.0 |
| 7 | 15.8 | 13.2 | 0.0 | 7.9 | 63.1 | 105 | 5500 | 15.0 |
| 8 | 18.0 | 11.8 | 0.0 | 7.8 | 62.4 | 105.3 | 5604 | 13.3 |
| 9 | 16.9 | 4.8 | 7.9 | 7.8 | 62.6 | 113.2 | 3750 | 12.6 |

TABLE 2

| Glass Frit No. | $B_2O_3$ | $SiO_2$ | ZnO | PbO |
|---|---|---|---|---|
| Example G1 | 20 | 10 | 55 | 15 |
| Comparative G2 | 3 | 27 | 60 | 10 |
| Comparative G3 | 35 | 20 | 40 | 5 |
| Comparative G4 | 20 | 3 | 55 | 22 |
| Comparative G5 | 15 | 45 | 35 | 5 |
| Comparative G6 | 20 | 30 | 49 | 1 |
| Comparative G7 | 10 | 15 | 32 | 43 |
| Comparative G8 | 12 | 10 | 75 | 3 |

TABLE 3

| Glass Frit No. | $SiO_2$ | BaO | $B_2O_3$ | $Li_2O$ |
|---|---|---|---|---|
| Example G9 | 30 | 25 | 40 | 5 |
| Comparative G10 | 20 | 20 | 55 | 5 |
| Comparative G11 | 40 | 32 | 19 | 9 |
| Comparative G12 | 11 | 38 | 42 | 9 |
| Comparative G13 | 45 | 20 | 30 | 5 |
| Comparative G14 | 25 | 29 | 45.5 | 0.5 |
| Comparative G15 | 16 | 25 | 45 | 14 |
| Comparative G16 | 15 | 45 | 35 | 5 |
| Comparative G17 | 38 | 8 | 49 | 5 |

TABLE 4

| Dielectric No. | Base Composition Kind | Base Composition Amount (wt %) | Glass Frit Kind | Glass Frit Amount (wt %) | CuO (wt %) | Dielectric Constant (k) | Q | TCF (ppm/° C.) | Note |
|---|---|---|---|---|---|---|---|---|---|
| Comparative 1 | 7 | 98.0 | G1 | 2.0 | 0 | — | — | — | [1]P. S. |
| Comparative 2 | 7 | 98.0 | G1 | 2.0 | 0 | 95 | 1500 | 12.5 | Sintered |
| Example 1 | 7 | 97.0 | G1 | 3.0 | 0 | 70 | 700 | 11.0 | Sintered |
| Example 2 | 7 | 95.0 | G1 | 3.0 | 2.0 | 80 | 800 | 4.0 | Sintered |
| Example 3 | 7 | 93.0 | G1 | 7.0 | 0 | 74 | 650 | 8.0 | Sintered |
| Example 4 | 7 | 86.0 | G1 | 14.0 | 0 | 70 | 600 | 7.5 | Sintered |
| Comparative 3 | 7 | 83.0 | G1 | 17.0 | 0 | 55.2 | 200 | 8.0 | Sintered |
| Example 5 | 7 | 92.0 | G1 | 7.0 | 1.0 | 77.5 | 960 | 6.5 | Sintered |
| Comparative 4 | 7 | 89.0 | G1 | 3.0 | 8.0 | 55 | 250 | 9.0 | Sintered |
| Comparative 5 | 7 | 90.0 | C. G2 | 10.0 | 0.0 | — | — | — | [2]N. S. |
| Comparative 6 | 7 | 90.0 | C. G3 | 10.0 | 0.0 | 73 | 550 | 8.6 | [3]P.M.R. |
| Comparative 7 | 7 | 90.0 | C. G4 | 10.0 | 0.0 | — | — | — | [2]N. S. |
| Comparative 8 | 7 | 90.0 | C. G5 | 10.0 | 0.0 | — | — | — | [2]N. S. |
| Comparative 9 | 7 | 90.0 | C. G6 | 10.0 | 0.0 | — | — | — | [2]N. S. |
| Comparative 10 | 7 | 90.0 | C. G7 | 10.0 | 0.0 | 69 | 100 | 8.3 | Poor Q |
| Comparative 11 | 7 | 90.0 | C. G8 | 10.0 | 0.0 | — | — | — | [2]N. S. |
| Comparative 12 | 8 | 98.0 | G9 | 2.0 | 0 | — | — | — | [2]N. S. |
| Comparative 13 | 8 | 98.0 | G9 | 2.0 | 0 | 90 | 1400 | 11.5 | Sintered |
| Example 6 | 8 | 97.0 | G9 | 3.0 | 0 | 75 | 900 | 10.0 | Sintered |
| Example 7 | 8 | 95.0 | G9 | 3.0 | 2.0 | 84 | 990 | 8.0 | Sintered |
| Example 8 | 8 | 93.0 | G9 | 7.0 | 0 | 76 | 800 | 8.0 | Sintered |
| Example 9 | 8 | 86.0 | G9 | 14.0 | 0 | 65 | 550 | 4.5 | Sintered |
| Comparative 14 | 8 | 83.0 | G9 | 17.0 | 0 | 58.5 | 150 | -2.0 | Sintered |
| Example 10 | 8 | 92.0 | G9 | 7.0 | 1.0 | 79.5 | 960 | 6.5 | Sintered |
| Comparative 15 | 8 | 89.0 | G9 | 3.0 | 8.0 | 50 | 180 | 5.0 | Sintered |
| Comparative 16 | 8 | 87.0 | C. G10 | 13.0 | 0.0 | 75.1 | 780 | 7.5 | [3]P.M.S. |
| Comparative 17 | 8 | 87.0 | C. G11 | 13.0 | 0.0 | — | — | — | [1]P. S. |
| Comparative 18 | 8 | 87.0 | C. G12 | 13.0 | 0.0 | — | — | — | [1]P. S. |
| Comparative 19 | 8 | 87.0 | C. G13 | 13.0 | 0.0 | — | — | — | [1]P. S. |
| Comparative 20 | 8 | 87.0 | C. G14 | 13.0 | 0.0 | — | — | — | [1]P. S. |
| Comparative 21 | 8 | 87.0 | C. G15 | 13.0 | 0.0 | 68 | 570 | 6.2 | [3]P.M.S. |
| Comparative 22 | 8 | 87.0 | C. G16 | 13.0 | 0.0 | 72 | 120 | 5.8 | Poor Q |
| Comparative 23 | 8 | 87.0 | C. G17 | 13.0 | 0.0 | — | — | — | [1]P. S. |

[1]poorly sintered
[2]not sintered
[3]poor moisture resistance

In addition to being sintered at as low as 900° C. the dielectric ceramic compositions 1~10 of the present invention, as shown in Table 4, have a dielectric constant of 70 or higher, a Q value of 500 or higher, and a TCF of ±20.0 ppm/° C.

In contrast, the comparative compositions 1~23 are not sintered at 900° C. or, even if sintered, show poor dielectric properties, including dielectric constant, Q value and TCF.

As mentioned above, the addition of glass frit and CuO to the base composition which is sinterable at 1,300° C. or higher makes it possible for the dielectric ceramic composition of the present invention to be cofired with Ag electrodes at as low as 900° C. Thus the dielectric ceramic compositions exhibit a dielectric constant of 60 or higher, a Q value of 500 or higher (at 3 GHz), and a TCF of ±20.0 ppm/° C., so that they are suitable for use in multilayered LC filters.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

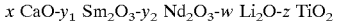

What is claimed is:

1. A dielectric ceramic composition, comprising 85.0~97.0 wt % of a base composition represented by the following chemical formula 1:

$$x \, CaO\text{-}y_1 \, Sm_2O_3\text{-}y_2 \, Nd_2O_3\text{-}w \, Li_2O\text{-}z \, TiO_2$$

wherein 13.0 mol % $\leq x \leq$ 20.0 mol %; 10.0 mol % $\leq y_1 + y_2 \leq$ 17.0 mol %; 6.0 mol % $\leq w \leq$ 11.0 mol %; 60.0 mol % $\leq z \leq$ 67.0 mol %, with the proviso that $x+y_1+y_2+w+z=100$; and 3.0~15.0 wt % of ZnO—$B_2O_3$—$SiO_2$ or $Li_2O$—$B_2O_3$—$SiO_2$ based glass frit.

2. The dielectric ceramic composition according to claim 1, further comprising CuO in an amount of 7.0 wt % or less.

3. The dielectric ceramic composition according to claim 1, wherein ZnO—$B_2O_3$—$SiO_2$ based glass frit comprises ZnO in an amount of 30~70 wt %, $B_2O_3$ in an amount of 5~30 wt %, $SiO_2$ in an amount of 5~40 wt %, and PbO in an amount of 2~40 wt %.

4. The dielectric ceramic composition according to claim 1, wherein the $Li_2O$—$B_2O_3$—$SiO_2$ based glass frit comprises $Li_2O$ in an amount of 1—10 wt %, BaO in an amount of 10~40 wt %, $B_2O_3$ in an amount of 20~50 wt %, and $SiO_2$ in an amount of 15~40 wt %.